United States Patent
Bruck et al.

(10) Patent No.: US 9,126,287 B2
(45) Date of Patent: Sep. 8, 2015

(54) ADVANCED PASS PROGRESSION FOR BUILD-UP WELDING

(75) Inventors: Gerald J. Bruck, Oviedo, FL (US); Petya M. Georgieva, Oviedo, FL (US); Brandon W. Shinn, Houston, TX (US)

(73) Assignee: Siemens Energy, Inc., Orlando, FL (US)

( * ) Notice: Subject to any disclaimer, the term of this patent is extended or adjusted under 35 U.S.C. 154(b) by 36 days.

(21) Appl. No.: 13/417,401

(22) Filed: Mar. 12, 2012

(65) Prior Publication Data

US 2013/0232749 A1   Sep. 12, 2013

(51) Int. Cl.
| | |
|---|---|
| *B23K 9/04* | (2006.01) |
| *B23K 33/00* | (2006.01) |
| *B23P 6/00* | (2006.01) |
| *B23K 26/34* | (2014.01) |
| *B23K 10/02* | (2006.01) |
| *B23K 15/00* | (2006.01) |
| *F01D 5/00* | (2006.01) |
| *B23K 26/32* | (2014.01) |
| *B23K 35/00* | (2006.01) |
| *B23K 35/02* | (2006.01) |
| *B23K 35/24* | (2006.01) |

(52) U.S. Cl.
CPC ............... *B23K 26/345* (2013.01); *B23K 9/042* (2013.01); *B23K 10/027* (2013.01); *B23K 15/0086* (2013.01); *B23K 26/3213* (2013.01); *B23K 35/007* (2013.01); *B23K 35/0244* (2013.01); *F01D 5/005* (2013.01); *B23K 2201/001* (2013.01); *B23P 6/007* (2013.01); *F05D 2230/31* (2013.01); *F05D 2230/80* (2013.01); *Y10T 29/49718* (2013.01)

(58) Field of Classification Search
CPC ............. B23K 26/345; B23K 35/0244; B23K 35/007; B23K 26/3213; B23K 9/042; B23K 10/027; B23K 15/0086; B23K 2201/001; F01D 5/005; F05D 2230/80; F05D 2230/31; B23P 6/007
USPC ................. 29/889.1, 402.01, 402.09, 402.13, 29/402.16, 402.18, DIG. 48; 219/76.1, 219/76.12, 76.13, 76.14, 137 R; 228/119, 228/182–184, 225–226
See application file for complete search history.

(56) References Cited

U.S. PATENT DOCUMENTS

| | | | | |
|---|---|---|---|---|
| 3,624,345 | A | * 11/1971 | Armstrong | 219/76.14 |
| 3,627,973 | A | * 12/1971 | Smith | 219/124.4 |
| 4,004,125 | A | * 1/1977 | Hood et al. | 219/60.2 |

(Continued)

FOREIGN PATENT DOCUMENTS

| | | |
|---|---|---|
| EP | 1466695 A1 | 10/2004 |
| EP | 1688211 A2 | 8/2006 |

(Continued)

*Primary Examiner* — David Bryant
*Assistant Examiner* — Darrell C Ford

(57) ABSTRACT

A method of build-up welding including depositing of a weld material on a substrate in a series of weld passes in side-by-side relation to form a first weld layer, wherein substantially all weld passes forming the first weld layer are deposited in a first pass direction. Subsequently, a series of weld passes are deposited in side-by-side relation on the first layer to form a second weld layer, wherein substantially all weld passes forming the second weld layer are deposited in a second pass direction opposite to the first pass direction. Each weld pass of each layer may be deposited at a location where it is restrained on no more than one lateral side extending parallel to the weld pass.

13 Claims, 3 Drawing Sheets

(56) References Cited

U.S. PATENT DOCUMENTS

| | | | |
|---|---|---|---|
| 4,491,266 A * | 1/1985 | Abe et al. | 228/225 |
| 4,544,825 A | 10/1985 | Cook | |
| 4,959,523 A * | 9/1990 | Fihey et al. | 219/124.34 |
| 5,166,495 A * | 11/1992 | Ekelof et al. | 219/124.34 |
| 5,545,873 A | 8/1996 | Sauer | |
| 5,735,044 A * | 4/1998 | Ferrigno et al. | 29/889.1 |
| 5,900,170 A | 5/1999 | Marcin, Jr. et al. | |
| 6,118,098 A | 9/2000 | Amos et al. | |
| 6,155,475 A * | 12/2000 | Ekelof et al. | 228/225 |
| RE37,562 E | 2/2002 | Clark et al. | |
| 6,495,793 B2 | 12/2002 | Tewari | |
| 6,872,912 B1 | 3/2005 | Wos et al. | |
| 6,889,889 B2 * | 5/2005 | Offer et al. | 228/119 |
| 7,182,580 B2 | 2/2007 | Bostanjoglo et al. | |
| 7,568,609 B2 * | 8/2009 | Shimohata et al. | 228/119 |
| 7,915,566 B2 | 3/2011 | Arjakine et al. | |
| 8,561,298 B2 * | 10/2013 | Morin et al. | 29/889.21 |
| 2002/0179583 A1 * | 12/2002 | Copeland et al. | 219/137 WM |
| 2003/0082297 A1 | 5/2003 | Wolkers et al. | |
| 2005/0029235 A1 * | 2/2005 | Mielke | 219/121.64 |
| 2005/0109818 A1 * | 5/2005 | Shimohata et al. | 228/119 |
| 2005/0194363 A1 * | 9/2005 | Hu et al. | 219/121.64 |
| 2005/0246893 A1 | 11/2005 | Fukunaga et al. | |
| 2006/0157165 A1 | 7/2006 | Kottilingam et al. | |
| 2008/0210347 A1 | 9/2008 | Morin et al. | |
| 2009/0001065 A1 | 1/2009 | Ladru et al. | |
| 2009/0246031 A1 * | 10/2009 | Rose | 416/223 R |
| 2009/0250447 A1 * | 10/2009 | Guth | 219/137 R |
| 2010/0074755 A1 * | 3/2010 | Richter et al. | 416/223 R |
| 2010/0205805 A1 | 8/2010 | Mega et al. | |
| 2010/0224600 A1 | 9/2010 | Anton et al. | |
| 2010/0326963 A1 * | 12/2010 | Peters et al. | 219/76.14 |
| 2011/0020127 A1 | 1/2011 | Burbaum et al. | |
| 2011/0031226 A1 | 2/2011 | Mokadem et al. | |
| 2011/0073636 A1 | 3/2011 | Arjakine et al. | |
| 2011/0089150 A1 | 4/2011 | Arjakine et al. | |
| 2011/0226390 A1 * | 9/2011 | Chen et al. | 148/527 |
| 2012/0043307 A1 * | 2/2012 | Lennartsson et al. | 219/137 R |
| 2012/0234798 A1 * | 9/2012 | Lin et al. | 219/73 |
| 2013/0232749 A1 * | 9/2013 | Bruck et al. | 29/402.01 |
| 2013/0316191 A1 * | 11/2013 | Kawasaki et al. | 428/679 |
| 2014/0001161 A1 * | 1/2014 | Van Liden | 219/76.14 |
| 2014/0054273 A1 * | 2/2014 | Behmlander et al. | 219/121.64 |
| 2015/0108098 A1 * | 4/2015 | Arjakine et al. | 219/76.14 |

FOREIGN PATENT DOCUMENTS

| | | |
|---|---|---|
| EP | 2311597 A1 | 4/2011 |
| EP | 2586561 A1 | 5/2013 |
| JP | 2008128147 A | 6/2008 |
| JP | 2012098120 A * | 5/2012 |
| SU | 1303315 A1 * | 4/1987 |

* cited by examiner

ADVANCED PASS PROGRESSION FOR BUILD-UP WELDING

FIELD OF THE INVENTION

The present invention relates to formation of build-up weld structures for components and, more particularly, to a method of forming a build-up weld structure provided to a turbine engine component.

BACKGROUND OF THE INVENTION

Various components of gas turbine engines, such as vanes and blades in a turbine section of the engine, are exposed to high temperatures and, in the case of rotating blades, may be subjected to strong mechanical loads during operation. Nickel-based superalloys may therefore be used as a preferred material for such components. The production of turbine blades and other components formed of such superalloys is complex and cost-intensive. Hence, there are efforts to produce as little scrap as possible, such as by repairing defects in production, and repairing damage resulting from service. For example, erosion, foreign object damage, and thermo mechanical fatigue cracks require repair to extend component life.

Gas turbine components, and in particular blades that are in operation, are routinely serviced and exchanged when necessary. In order to extend the operational life of the components, whenever possible they are refurbished, after which they may be used once again in a gas turbine. Such refurbishment may, for example, involve the necessity for build-up welding in damaged regions, in order to restore the original component features and/or dimensions. In particular, for superalloy components, a laser cladding operation may typically be utilized to perform the repair. Laser cladding may be performed with a relatively low heat input to apply metal depositions to a substrate, and avoids altering the material properties of the underlying superalloy component. Superalloy components typically comprise a single crystal and directionally solidified structure susceptible to recrystallization when subjected to a high heat input, such as may occur using conventional welding processes, such as plasma arc welding, or gas tungsten arc welding.

At present, there are ongoing challenges in the weld repair process. Various factors affect the quality of the build-up weld as the build-up weld is formed, including factors that may cause recrystallization within the weld material and factors that may cause microscopic separations or cracks in the weld material.

SUMMARY OF THE INVENTION

In accordance with an aspect of the invention, a method is provided for repairing or modifying a turbine engine component defining a substrate by performing a build-up welding operation on a welding surface of the substrate. The method comprises providing a substrate defining a welding surface and depositing a weld material on the welding surface. The depositing of the weld material includes depositing a series of weld passes in side-by-side relation on the welding surface to form a first weld layer, wherein substantially all weld passes forming the first weld layer are deposited in a first pass direction; and depositing a series of weld passes in side-by-side relation on the first layer to form a second weld layer, wherein substantially all weld passes forming the second weld layer are deposited in a second pass direction opposite to the first pass direction.

In accordance with additional aspects, the weld passes of the second weld layer may be generally parallel to the weld passes of the first weld layer. One or more additional weld layers may be formed above the second weld layer, wherein each successive weld layer is formed with substantially all weld passes deposited in a direction opposite from the direction of weld passes in an immediately preceding layer. Each weld pass of each layer may be deposited at a location where it is restrained on no more than one lateral side extending parallel to the weld pass, extending along substantially an entire length of the weld pass.

The substrate may include an extension surface extending out of plane with respect to other portions of the welding surface, the extension surface having a component extending in a direction parallel to or at an angle generally toward the direction of the weld build-up formed by the first and second weld layers. Additionally, the weld passes of each layer may extend generally parallel to a junction between the extension surface and the welding surface, and each weld pass of each layer may be deposited at a location where it is restrained on no more than one lateral side extending parallel to the weld pass. The weld passes for each weld layer may be deposited in side-by-side positions extending sequentially in a direction from the extension surface.

In accordance with a further aspect of the invention a method is provided for repairing or modifying a turbine engine component defining a substrate by performing a build-up welding operation on a welding surface of the substrate. The method comprises providing a substrate defining a welding surface, and depositing a weld material on the welding surface, including depositing two or more layers of weld material, each layer comprising one or more passes of the weld material; and each weld layer having a direction of progression of weld solidification that is opposite to a direction of progression of the weld solidification of the next previous weld layer.

Additional aspects include the one or more passes of each layer may be generally parallel to the one or more passes of each of the other layers. Each weld pass of each layer may be deposited at a location where it is restrained on no more than one lateral side extending parallel to the weld pass and extending along substantially an entire length of the weld pass.

In accordance with a yet further aspect of the invention, a method is provided for repairing or modifying a turbine engine component defining a substrate by performing a build-up welding operation on a welding surface of the substrate. The method comprises providing a substrate defining a welding surface, wherein the substrate includes an extension surface extending out of plane with respect to other portions of the welding surface. A weld material is deposited on the welding surface, including depositing the weld material in a plurality of layers, each layer comprising a series of weld passes in side-by-side relation. In addition, the weld passes of each layer extend generally parallel to a junction between the extension surface and the welding surface, and each weld pass of each layer is deposited at a location where it is restrained on no more than one lateral side extending parallel to the weld pass.

Additional aspects of the invention include the weld passes for each weld layer may be deposited in side-by-side positions extending sequentially in a direction from the extension surface. Each weld layer may be deposited such that it has a direction of progression of weld solidification that is opposite to a direction of progression of the weld solidification of the next previous weld layer. The weld passes of each weld layer may be generally parallel to the weld passes of each of the other layers. An initial weld pass for each layer may be deposited along the extension surface. The substrate may comprise a welding surface located on a component for a turbine engine, and the component may comprise a superalloy.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

In accordance with an aspect of the invention, it has been observed that component structures formed by multi-layer structural welding may be imbued with improved durability by reducing crack formation and propagation by limiting or reducing stresses and polycrystalline solidification during the welding process. In particular, an aspect of the invention may be described by a build-up weld structure formed on, for example, a superalloy substrate where the build-up weld structure is formed by weld passes provided in an order and direction to limit or minimize recrystallization and/or limit or minimize formation of cracks in the welded structure.

Conventional processes for producing build-up weld structures including, for example, provision of a welded cladding to superalloy components, is often performed without reference to the particular order of welding progression for forming the build-up welded structure. In particular, the direction of weld passes and the placement of weld passes relative to surrounding structure during the build-up welding process is frequently not given consistent consideration. In accordance with aspects of the invention, the structure of a build-up weld structure may be controlled to minimize or reduce crack formation by a planned progression of weld passes, selected with reference to substrate structure in the area of the weld passes. In accordance with further aspects of the invention, the structure of a build-up weld structure may be controlled to minimize or reduce crack propagation between adjacent layers formed by weld passes by selecting a direction for the weld passes of each layer with reference to the direction of weld passes of adjacent layers so as to preserve grain extension in a preferred growth direction and to minimize or reduce the onset of polycrystalline solidification and attendant cracking.

Figure 1:
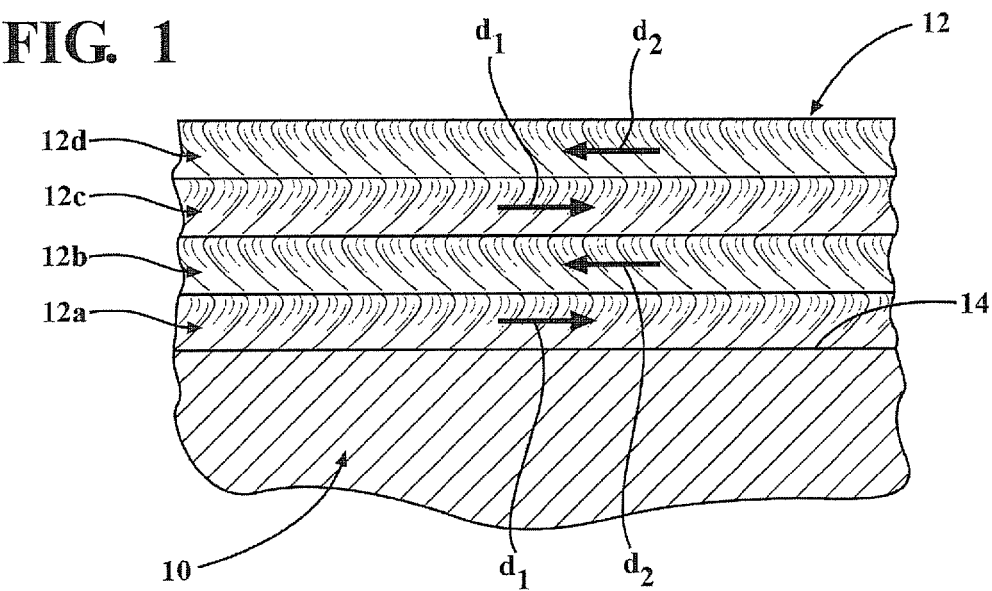
FIG. 1 is a cross-sectional view of a turbine engine component with a layered build-up weld structure in accordance with aspects of the present invention.

Referring to FIG. 1, a component or substrate 10 for receiving a build-up weld structure 12 is illustrated and may preferably comprise a superalloy, such as is often used for a gas turbine engine vane or blade. For example, the substrate 10 may depict a superalloy gas turbine vane or blade subjected to high temperature working gases passing through the turbine section of a gas turbine engine. Such a superalloy is typically a nickel-based superalloy which is formed in a casting operation and is capable of withstanding the high temperatures of the turbine section.

The substrate 10 includes an exposed welding surface 14 for receiving the weld structure 12, and may typically comprise a prepared or conditioned surface, such as a surface formed by removal of damaged material from the component by grinding or other mechanical and/or chemical processes in preparation for receiving cladding or other replacement material forming the weld build-up structure 12. Alternatively, the build-up weld structure 12 need not necessarily be formed as a repair on a used component, and may comprise structure for newly manufactured components. The build-up weld structure 12 is formed of a plurality of layers of weld material, represented in FIG. 1 by four layers 12a, 12b, 12c, 12d wherein the weld layer 12a comprises a first weld layer deposited directly on the welding surface 14. It may be understood that, although four weld layers are illustrated herein, any number of a plurality of layers may be provided.

Figure 2:
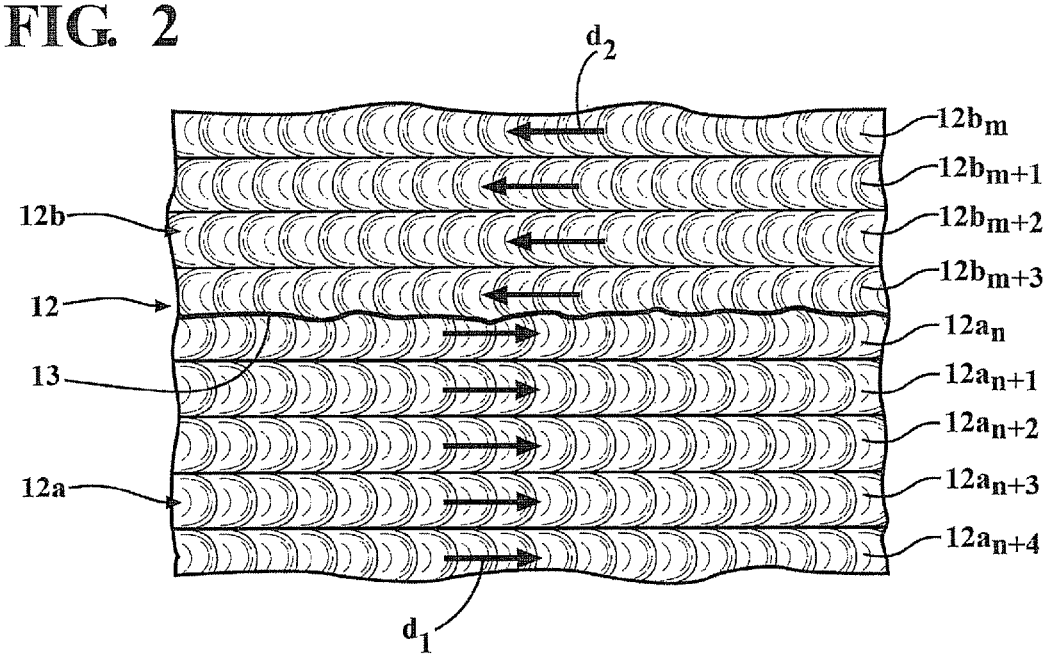
FIG. 2 is a plan view of a portion of the turbine engine component of FIG. 1 including two layers of a build-up weld structure with an upper layer thereof partially cut away.

In accordance with a first described aspect of the invention, each of the plurality of layers 12a-d is formed by a plurality of beads or weld passes, wherein the weld passes of each layer 12a-d are deposited with a uniform weld pass direction, as is described in detail below. The weld passes are further illustrated in FIG. 2, where the first two layers 12a and 12b of the build-up weld structure 12 are shown, with the second layer 12b partially cut away, i.e. at line 13, to provide an exposed view of a portion of the first layer 12a. The exposed weld passes of the first layer 12a, as seen in FIG. 2, comprise a series of side-by-side weld passes identified as first weld passes $12a_n$, $12a_{n+4}$. Similarly, the weld passes of the second layer 12b comprise a series of side-by-side weld passes identified as second weld passes $12b_m$, ... $12_{m+3}$. It may be understood that additional weld passes of the first layer 12a underlie and form a welding surface for the weld passes of the second layer 12b, and that more or fewer than the illustrated weld passes may be provided to each layer.

The weld passes $12b_m$, ... $12_{m+3}$ of the second layer 12b are deposited on the first layer 12a in a direction that is generally parallel to the weld passes $12a_n$, $12a_{n+4}$ of the first layer 12a. Further, the weld passes $12b_m$, $12_{m+3}$ of the second layer 12b, and the weld passes of each subsequent layer, are deposited in a manner so as to preserve a preferred underlying grain orientation of preceding layers. In accordance with this aspect, each of the weld passes $12b_m$, ... $12_{m+3}$ of the second layer 12b are deposited such that a direction of progression of weld solidification of each of the second weld passes $12b_m$, ... $12_{m+3}$ is opposite to the direction of progression of weld solidification of the first weld passes $12a_n$, $12a_{n+4}$ forming the underlying first layer 12a.

The direction of progression of weld solidification may be controlled by depositing the weld passes of each layer in a direction opposite to a preceding layer. With reference to FIG. 2, the first weld passes $12a_n$, $12a_{n+4}$ of the first layer $12a$ are illustrated deposited in a uniform direction defining a first weld pass direction $d_1$. The second weld passes $12b_m$, ... $12_{m+3}$ of the second layer $12b$ are deposited on the first layer $12a$ in a uniform direction defining a second weld pass direction $d_2$, opposite to the first weld pass direction $d_1$. Hence, the first weld passes $12a_n$, ... $12a_{n+4}$ may be representative of all of the weld passes forming the first layer $12a$ and deposited in the first direction $d_1$, and the second weld passes $12b_m$, ... $12_{m+3}$ may be representative of all of the weld passes forming the second layer $12b$ and deposited in the second direction $d_2$. The weld pass direction for each subsequent layer is deposited in an opposite weld pass direction to that of the immediately preceding layer. This may be seen in FIG. 1 in which the weld passes of the first and third weld layers $12a$, $12c$ are deposited in the first weld direction $d_1$, and the weld passes of the second and fourth weld layers $12b$, $12d$ are deposited in the second weld direction $d_2$.

It should be understood that, in accordance with aspects of the invention, reference to "all" and/or "substantially all" of the weld passes in a layer of the build-up weld structure is intended to refer to the weld passes of one layer that overlie or overlap with an adjacent layer, and which are deposited relative to adjacent layers so as to preserve grain extension in a preferred growth direction from one layer to the next, as described herein.

Figure 3:
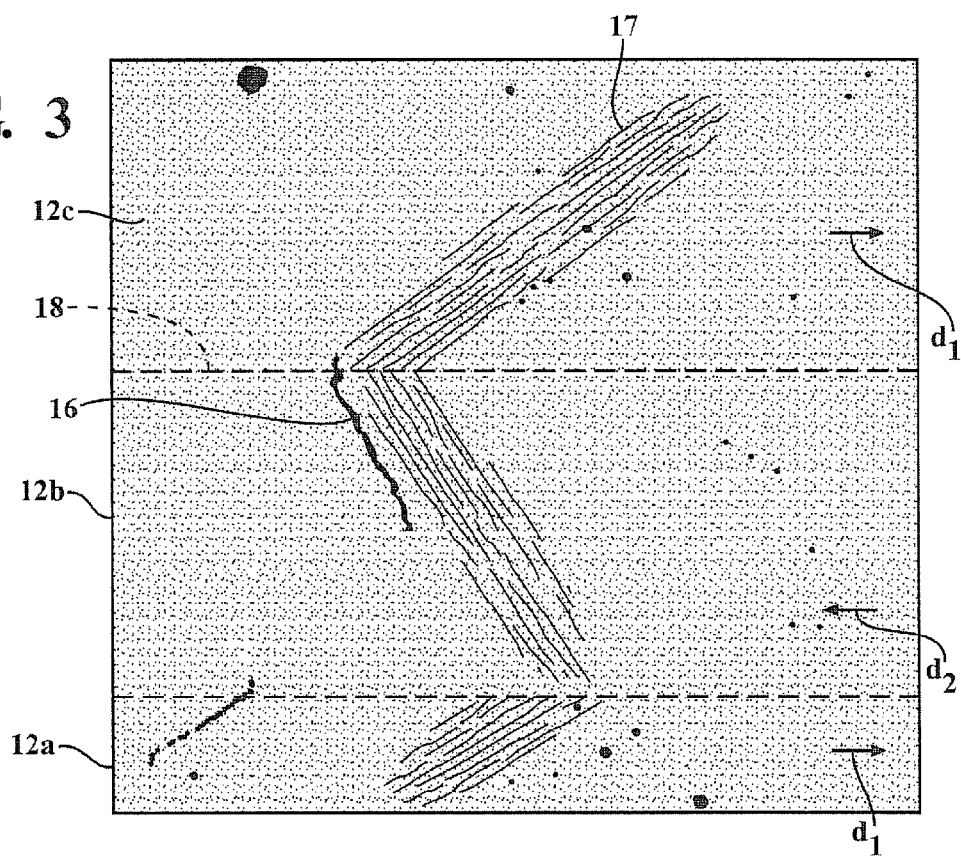
FIG. 3 is an enlarged cross-sectional view similar to FIG. 1 illustrating termination of a crack at an interface between weld layers of the build-up weld structure.

Each weld layer is deposited such that it has a direction of progression of the weld solidification that is opposite to a direction of progression of the weld solidification of the next previous weld layer. Alternating the direction of progression of the solidification from one layer to the next preserves the grain extension in a preferred growth direction in each layer, and avoids the onset of polycrystalline solidification and the associated cracking that may occur in accordance with conventional non-alternating weld progression. Additionally, the alternating weld pass direction of the layers avoids crack extension from one layer to the next layer, in that the alternating welding process direction provides an alternating direction of grain extension that resists the growth of cracks past the interface between layers, as is illustrated in FIG. 3 by the crack 16 located in the layer $12b$ and terminating at an interface 18 between layers $12b$ and $12c$. Further, alternating the solidification direction of the layers $12a$-$d$ limits or reduces stresses that may build up in the deposited material as the build-up weld structure 12 is formed.

The presently described process of forming a weld structure 12 may be applied to a directionally solidified (DS) superalloy casting, defining the substrate 10, to extend the structure of the casting with improved strength and resistance to propagation of cracks. In accordance with this aspect, the direction of application of the weld passes may be selected to avoid recrystallization of the material of adjacent weld layers.

The mechanism explaining this advantage is related to the fact that during weld solidification grains grow perpendicular to the solid-liquid interface and in the direction of maximum temperature gradient. In the original DS casting process forming the substrate 10, such temperature gradient was nearly uniaxial and resulted in the corresponding grain directionality, such as extending generally in the radial direction from the base to the tip of a blade. For non-alternating weld buildup layers the temperature gradient tends to repeatedly favor the singular weld direction. The preferred or easy growth direction of original DS cast grains can extend for one layer of buildup with slightly off axis gradient, i.e., off axis from the radial direction of the blade, due to weld directionality. However, repeated layers with the same weld direction result in new grain nucleation of orientation favoring the continuously off axis gradient in a single off axis direction. For alternating weld buildup layers the temperature gradient is alternated in direction between each successive layer and, though grains 17 may "zig-zag" between layers (FIG. 3), the grains are "steered" and extend in a general direction similar to the original, underlying DS cast microstructure of the substrate 10, i.e., the grains 17 extend in a generally radial direction.

In accordance with a second described aspect of the invention, the weld passes in each layer are preferably deposited in a predetermined order of progression, as is described with reference to FIGS. 4 and 5, in which elements corresponding to elements described in FIGS. 1-2 are labeled with the same reference numerals increased by 100.

Figure 4:
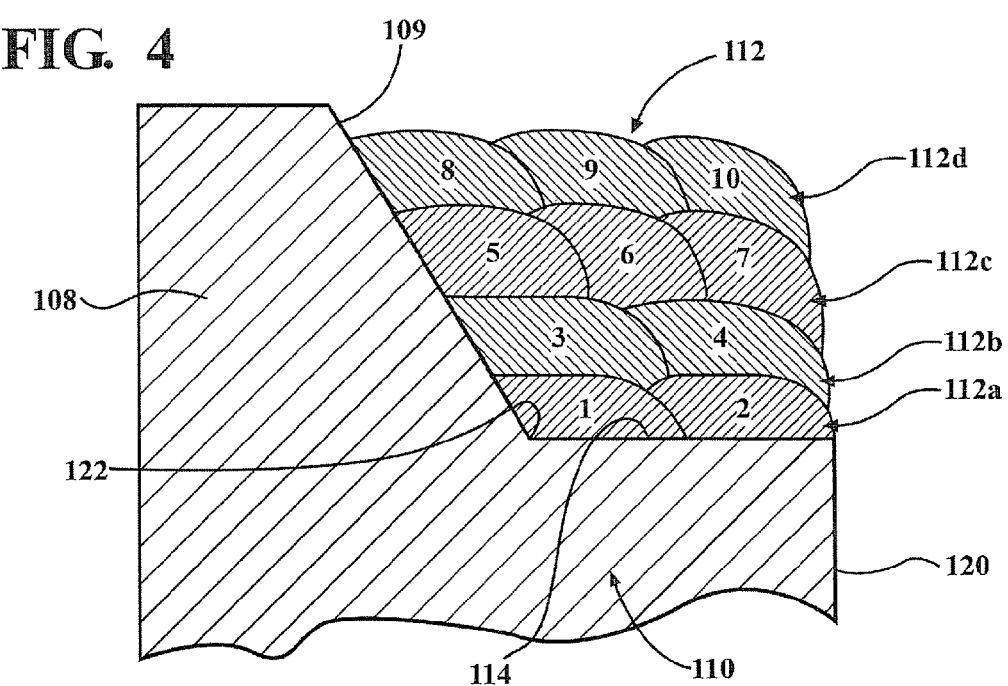
FIG. 4 is a cross-sectional view of a turbine engine component illustrating a sequence of weld pass positions in accordance with aspects of the present invention.

As seen in FIG. 4, a plurality of layers $112a$-$d$ are deposited as a build-up weld structure 112 on a substrate 110 defining a welding surface 114. The substrate 110 may include an extension structure 108 defining an extension surface 109 extending out of plane with respect to other portions of the welding surface 114. For example, the extension surface 109 may have a component extending in a direction that may be parallel to or at an angle generally toward the direction of the weld build-up formed by the weld layers $112a$-$d$, as is described further below.

Figure 6:
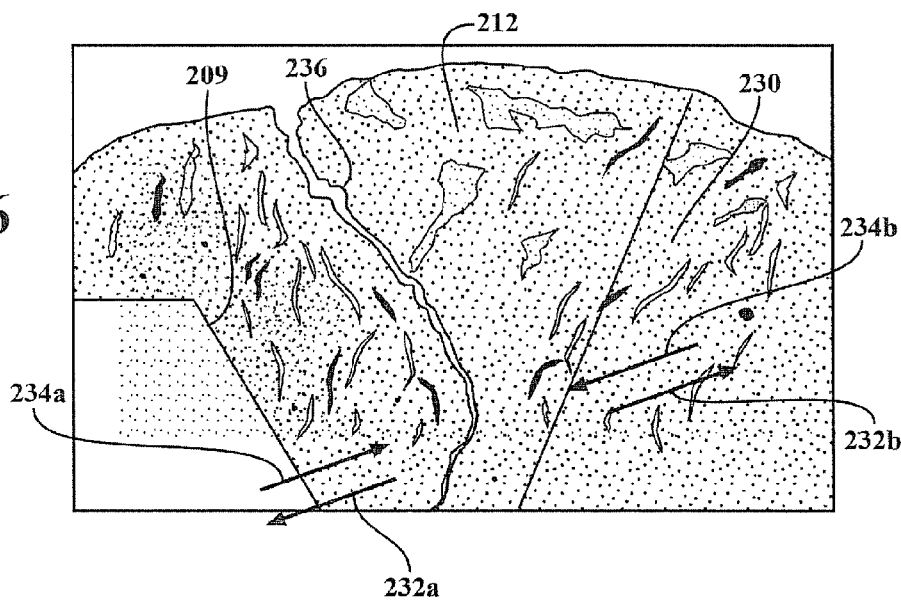
FIG. 6 is an enlarged cross-sectional view of a layer of a build-up weld structure in accordance with a prior art process, illustrating a shrinkage crack formed between two lateral restraining sides.

As depicted in FIG. 4, each weld layer $112a$-$d$ is defined by a series of beads or weld passes deposited in side-by-side relation in a predetermined sequence to minimize shrinkage stresses and associated cracking. In particular, an aspect of the invention is directed to avoiding highly laterally restrained weld pass locations, such as a location where the material of a single weld pass is required to accommodate shrinkage in opposing lateral directions, i.e., in opposing directions generally perpendicular to the direction of the weld pass. FIG. 6 illustrates a lateral restraint condition in which a weld pass 212 is deposited between two regions, each forming a lateral restraint, such as a first region defined by an extension surface 209 and a second region 230 that may be defined by a prior deposited weld pass, wherein the two regions extend a substantial distance in an outward direction along the lateral sides of the weld pass 212, the outward direction being generally transverse to the weld pass direction and to the lateral direction. Cooling of the weld pass 212 occurs in the direction depicted by arrows $232a$, $232b$, with resulting solidification occurring in the direction of arrows $234a$, $234b$. A shrinkage crack 236 may form as a result of the solidification occurring in a direction from the opposing lateral restraint regions 209, 230 inwardly toward the central portion of the weld pass 212, leaving a cavity or crack in a central location of the weld as the final material of the weld pass 212 solidifies from the opposing lateral sides with associated shrinkage.

In accordance with the second aspect of the invention, it has been recognized that shrinkage crack formation may be avoided or limited by an intentional selection of weld pass sequencing to provide no more than one lateral restraint to each weld pass. That is, the present aspect of the invention requires a purposeful selection of weld pass sequencing in which each weld pass of each layer is deposited at a location where it is restrained on no more than one lateral side extending parallel to the weld pass, extending along substantially an entire length of the weld pass. The term "lateral restraint" is used herein to include a solid structure adjacent to and in contact with a weld bead or pass, that extends outwardly, i.e., in the direction of weld build-up, from a welding surface for the weld pass and that may form an attachment location restraining a substantial portion of the weld pass material to a lateral side of the weld pass as it solidifies. Such lateral restraints can be formed, for example, by structure that acts as a heat sink that cools and causes solidification of a lateral side of the weld pass. A laterally restrained side may be contrasted to an unrestrained lateral side of the weld pass having a substantial portion extending outwardly from a welding surface that may be open to the surrounding ambient environment, i.e., a gas or air, and which is not restrained by attachment to a structure as it cools.

Figure 5:
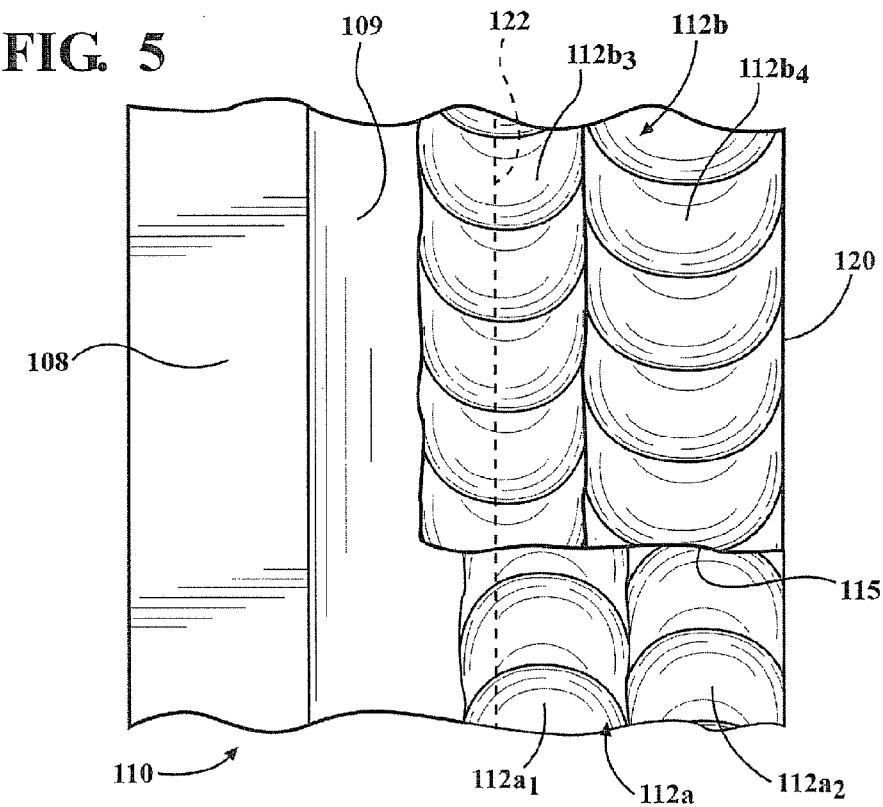
FIG. 5 is a plan view of a portion of the turbine engine component of FIG. 4 including two layers of a build-up weld structure with an upper layer thereof partially cut away.

FIG. 5 illustrates an initial portion of the welding process in which the first and second weld layers 112a, 112b have been deposited, and in which a portion of the second weld layer 112b is cut away, i.e., at line 115, to expose a view of a portion of the first layer 112a. The weld passes are designated 112a1, 112a2 in weld layer 112a and designated 112b3, 112b4 in weld layer 112b, and extend generally parallel to each other and generally parallel to a junction or joint 122 defined between the extension surface 109 and the welding surface 114.

A sequence of the weld passes is depicted in FIG. 4, and is identified by a sequence of numerals positioned within each of the weld passes illustrated in FIG. 4. In particular, the first weld layer 112a includes weld passes 1 and 2, where the sequence of passes proceeds from a laterally restrained location of the extension surface 109 to an unrestrained location, depicted as an open side adjacent to the right side 120 of the substrate 110. That is, weld pass 1 in layer 112a may be formed between the laterally restrained side defined by the extension surface 109 and the laterally unrestrained side opposite from the extension surface 109, and the weld pass 2 in layer 112a may be formed between the laterally restrained side defined by the weld pass 1 and the laterally unrestrained side opposite from the weld pass 1 at the right side 120. Similarly, the weld passes 3 and 4 of the second layer 112b, the weld passes 5, 6 and 7 of the third layer 112c, and the weld passes 8, 9 and 10 of the fourth layer 112d are shown in positions sequentially progressing from the extension surface 109 toward the unrestrained location. Hence, in the illustrated example, the weld passes for each layer 112a-d are deposited such that each weld pass is deposited at a location where no more than one lateral restraint, such as a lateral restraint that may be formed by either the extension surface 109 or by other weld passes, is allowed in each of the plurality of layers 112a-d deposited sequentially as a build-up weld structure 112 on the welding surface 114.

It may be understood that the weld passes forming each layer 112a-d may comprise individual or separate generally linear weld passes, such as may be applied to a component or substrate 110 having a planar welding surface, where each weld pass for a particular layer 112a-d may be initiated from the same end of the substrate and terminated at the opposite end of the substrate. Such a substrate may comprise a blade tip, such as a blade tip having a tip cap where the build-up weld structure may comprise a squealer tip, as may be exemplified by FIG. 4. In accordance with the first described aspect of the invention, the weld passes may be initiated and terminated at alternating ends of the substrate 110 for each subsequent layer.

Alternatively, the component or substrate 110 may comprise a cylindrical structure, such as a rotor disk, that is rotated while a continuous spiral weld is formed for each layer 112a-d, each rotation of the substrate defining a weld pass. In this regard, the first described aspect of the invention may be implemented by rotating the substrate in alternating directions to form each subsequent layer 112a-d, and the continuous weld for each layer 112a-d may be initiated at the same end of the cylindrical substrate 110, such as at an end of the substrate 110 that includes an extension surface 109.

The welding process of the present invention may be implemented by, any known process for applying heat to the welding material, which process may be selected, for example, with reference to the material of the substrate receiving the build-up weld structure. For example, typical welding methods for implementing the invention may utilize laser cladding, plasma arc welding, gas tungsten arc welding, electron beam welding, and other similar processes. Further, it may be understood that a welding filler material, (in forms such as powder, wire or strip) and such as is typically used for build-up weld structures and/or a welding material typically associated with the afore-mentioned welding methods for applying heat, may be implemented in the present build-up welding process.

It should be understood that the different aspects of the invention, as described herein, function together to provide crack avoidance and stress reduction in a build-up weld structure, with associated improvements in strength and durability of the build-up weld structure. Further, the individually described aspects of the invention are capable of being implemented independently for providing improved aspects of the strength and durability of a build-up weld structure.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of repairing or modifying a turbine engine component defining a substrate by performing a build-up welding operation on a welding surface of the substrate, the method comprising:
   providing a substrate defining a welding surface;
   depositing a weld material on the welding surface, including:
      depositing a plurality of sequential weld passes in side-by-side relation directly on the welding surface to form a first weld layer, wherein all weld passes forming the first weld layer are deposited in a first pass direction, and each said weld pass is defined by a weld bead laid down progressing in the same lengthwise direction of the weld bead as a previous adjacent weld bead of the first weld layer; and
      subsequent to formation of the first weld layer on the welding surface, depositing a plurality of sequential weld passes in side-by-side relation on the first weld layer to form a second weld layer, wherein all weld passes forming the second weld layer are deposited in a second pass direction generally parallel to the weld passes of the first weld layer and opposite to the first pass direction, and each said weld pass of the second weld layer is defined by a weld bead laid down progressing in the same lengthwise direction of the weld bead as a previous adjacent weld bead of the second weld layer.

2. The method of claim 1, including one or more additional weld layers formed above the second weld layer, wherein each successive weld layer is formed with substantially all weld passes deposited in a direction opposite from the direction of weld passes in an immediately preceding weld layer.

3. The method of claim 1, wherein each weld pass of each weld layer is deposited at a location where each weld pass is restrained on no more than one lateral side extending parallel to the weld pass, extending along substantially an entire length of the weld pass.

4. The method of claim 1, wherein the substrate includes an extension surface extending out of plane with respect to other portions of the welding surface, the extension surface having a component extending in a direction parallel to or at an angle generally toward the direction of the weld build-up formed by the first and second weld layers, and wherein:
- the weld passes of each weld layer extend generally parallel to a junction between the extension surface and the welding surface; and
- each weld pass of each weld layer is deposited at a location where each weld pass is restrained on no more than one lateral side extending parallel to the weld pass.

5. The method of claim 4, wherein the weld passes for each weld layer are deposited in side-by-side positions extending sequentially in a direction from the extension surface.

6. A method of repairing or modifying a turbine engine component defining a substrate by performing a build-up welding operation on a welding surface of the substrate, the method comprising:
- providing a substrate defining a welding surface;
- depositing a weld material on the welding surface, including depositing two or more layers of weld material, each weld layer comprising a plurality of sequential passes of the weld material and the passes of weld material forming the first weld layer being deposited directly on the welding surface, and the next subsequent layer being deposited on the first layer, all of the passes of each weld layer defining a single direction of weld solidification and being deposited sequentially in side-by-side relation to complete a weld layer prior to formation of a next weld layer, each said pass of the weld material is defined by a weld bead laid down progressing in the same lengthwise direction of the weld bead as a previous adjacent weld bead of the first weld layer, where each pass of the weld material is completed prior to formation of the next adjacent pass of weld material; and
- the direction of progression of weld solidification of each weld layer is opposite to the direction of progression of the weld solidification of the next previous weld layer.

7. The method of claim 6, wherein the plurality of passes of each weld layer are generally parallel to the plurality of passes of each of the other weld layers.

8. The method of claim 6, wherein each weld pass of each weld layer is deposited at a location where each weld pass is restrained on no more than one lateral side extending parallel to the weld pass and extending along substantially an entire length of the weld pass.

9. A method of repairing or modifying a turbine engine component defining a substrate by performing a build-up welding operation on a welding surface of the substrate, the method comprising:
- providing a substrate defining a welding surface, wherein the substrate includes an extension surface extending out of plane with respect to other portions of the welding surface;
- depositing a weld material on the welding surface, including depositing the weld material in a plurality of weld layers, each weld layer comprising a plurality of sequential weld passes in side-by-side relation, the weld passes of each weld layer are deposited in a pass direction that is opposite to the pass direction of the weld passes of the next previous weld layer, and wherein:
  - the weld passes of each weld layer extend generally parallel to a junction between the extension surface and the welding surface, and extending along the length of the junction formed between the extension surface and the welding surface; and
  - a first weld pass of the first weld layer is deposited in attached engagement with both the extension surface and the welding surface, and a first weld pass of each weld layer subsequent to the first weld layer is deposited in attached engagement with the extension surface, each weld pass of each weld layer is sequentially deposited at a location away from the extension surface where each weld pass is restrained on no more than one lateral side extending parallel to the weld pass.

10. The method of claim 9, wherein the weld passes for each weld layer are deposited in side-by-side positions extending sequentially in a direction from the extension surface.

11. The method of claim 9, wherein the weld passes of each weld layer are generally parallel to the weld passes of each of the other weld layers.

12. The method of claim 9, wherein the substrate comprises a welding surface located on a component comprising one of a vane and a blade for a turbine engine.

13. The method of claim 12, wherein the component comprises a superalloy, and a laser cladding process is used to deposit the weld material.

\* \* \* \* \*